Sept. 15, 1931.   J. NEWMANN   1,823,464
RADIAL MOTOR
Original Filed Feb. 23, 1928   2 Sheets-Sheet 1
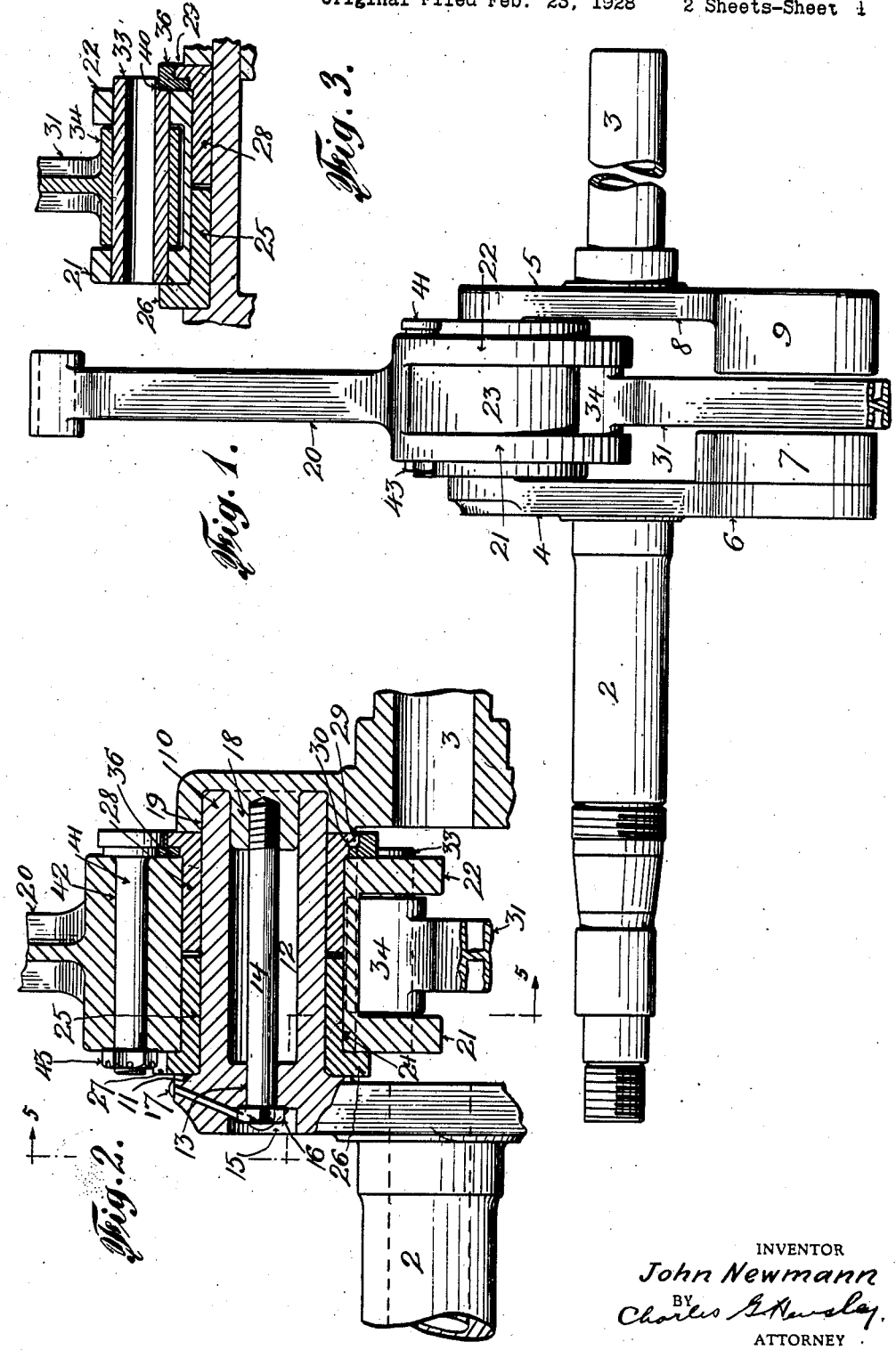
INVENTOR
John Newmann
BY
Charles G. Hensley
ATTORNEY Sept. 15, 1931.     J. NEWMANN     1,823,464
RADIAL MOTOR
Original Filed Feb. 23, 1928     2 Sheets-Sheet 2
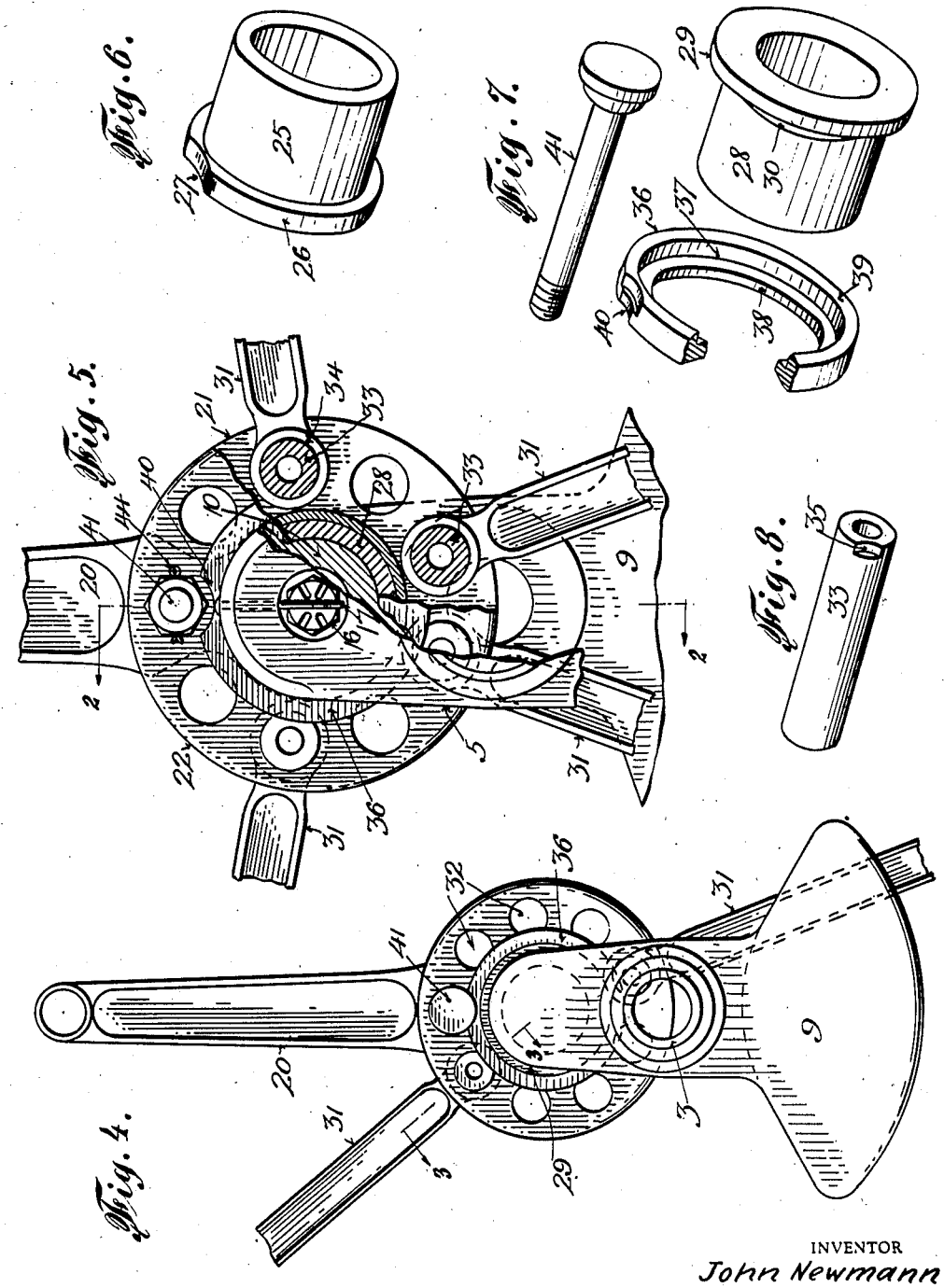
INVENTOR
John Newmann
BY
Charles G. Hensley.
ATTORNEY Patented Sept. 15, 1931

1,823,464

UNITED STATES PATENT OFFICE

JOHN NEWMANN, OF GLENDALE, NEW YORK; CHARLES G. HENSLEY, RECEIVER, OF NEW YORK, N. Y.

RADIAL MOTOR

Application filed February 23, 1928, Serial No. 256,146. Renewed August 9, 1929.

My invention relates to radial motors and while it is especially adapted for motors to be used on aeroplanes, nevertheless it is also adapted to be used in connection with other types of motors. The invention relates to that type of radial motor wherein an annular connecting member is integral with, or connected to a master connecting rod, and wherein a plurality of articulated connecting rods are pivotally connected with the annular member, whereby a number of motor cylinders may be arranged around a common axis and have their several connecting rods operating on a common crank. A motor of this type is shown in my Patent No. 1,572,672.

One of the principal objects of my present invention is to provide a simple form of knuckle pin for the bearing on each connecting rod, except for the master piston rod, which knuckle pins will be simple to assemble and disassemble.

Another object of my invention is to provide a very simple and efficient device for holding the several knuckle pins in assembled position in relation to the several connecting rods, and which will permit the rapid assembly and disassembly of any or all of the connecting rods and their several knuckle pins. This branch of the invention is intended to simplify the construction and to reduce the number of parts to a minimum. It is also adapted to eliminate troubles which are likely to arise in previous devices where a large number of bolts are employed for holding the parts assembled and which bolts are all liable to become loosened in the operation of the motor.

Another object of the invention is to provide a crank construction in which counter weights may be employed to counterbalance the crank on the crank shaft. The crank construction contains novel features which facilitate the assembly and disassembly of the parts and is what may be termed a two-piece construction, which, when assembled, will be substantially as strong and rigid as a construction in which the crank and the shaft are all made in one piece. Other advantages will be set forth in the following detailed description of my invention.

In the drawings forming part of this application,

Figure 1 is an elevation of a driving shaft and crank, showing certain of the connecting rods, Figure 2 is a sectional view taken on the line 2—2 of Figure 5, Figure 3 is a sectional view taken on the line 3—3 of Figure 4, Figure 4 is an end view of the device shown in Figure 1, in which view, however, only two of the connecting rods are shown assembled, whereas in Figure 5 a greater number of connecting rods are shown in assembled position, Figure 5 is a sectional view taken on the line 5—5 of Figure 2, Figure 6 is a perspective view of one of the bushing members, Figure 7 is a group view showing various parts in perspective, and Figure 8 is a perspective view of one of the knuckle pins.

The present invention, as above stated, is adapted more especially to that type of motor wherein a number of cylinders are arranged radially around a common axis with all of the connecting rods of the several pistons connected to a common crank, although certain features of the invention may be utilized in other types of motors. I will describe my invention, however, as applied to a radial motor, without intending to limit the invention to this particular adaptation, except in so far as some of the claims herein may be definitely limited to a particular embodiment.

In the construction illustrated in the drawings it is intended that nine motor cylinders shall be arranged radially around a common axis, but it will be understood that my invention is not limited to the use of any definite number of cylinders.

In the drawings I have shown a shaft 1 which is the shaft that is to be driven by the several pistons of the radial motor. This shaft is composed of the two sections 2 and 3 adapted, when assembled, to lie in axial alignment with each other, and each carrying a portion of the crank. For instance, the shaft section 2 has formed integral with it, or applied to it, a member 4 forming one side of the crank and projecting laterally from the axis of the shaft. The shaft section 3 has formed integral with it, or attached permanently to it, a member 5 which forms the other side of the crank and which projects laterally from the axis of the shaft and parallel with the crank member 4. Preferably, the crank member 4 is extended in the opposite direction from the axis of the shaft to form an arm 6 which carries a counter weight 7 for counterbalancing the weight of the crank. In like manner, the arm 8 is extended in the opposite direction to the portion 5 and it is provided with a weight 9 which also serves for counterbalancing the weight of the crank.

The crank arm 4 at the left in Figure 2 is provided with a wrist pin here shown as a tubular portion 10 extending horizontally, and at one end of this tubular portion there is a shoulder 11 against which the bushing is adapted to engage. The tubular member 10 has an internal bore 12 and there is a reduced bore 13 extending inwardly in the member 4 and concentric with relation to the bore 12 for the purpose of receiving therein a bolt 14. The member 4 is provided with a recess 15 in one face thereof, in which the head 16 of the bolt 14 is adapted to be retained; and I have shown a locking pin 17 extending through an aperture in the member 4 for the purpose of engaging a slot in the head 16 of the bolt, for the purpose of locking this bolt from moving under the action of the vibrations of the motor. The arm 5 at the right side of Figure 2 is provided with a central boss 18 which is adapted to fit into the bore 12 of the tubular wrist pin 10; and this arm 5 is also provided with an annular socket 19 which fits over one end of the wrist pin 10, so that these portions of the member 5 form an inner and outer connection with the wrist pin 10 whereby the several parts are rigidly held in alignment. The bolt 14 has one end threaded into a threaded aperture in the boss 18 so that this bolt serves to hold the arms 4, 5 in assembled position, and it forms means for holding the members of the crank and the shaft sections in assembled position.

The master connecting rod 20 is connected with the piston of one of the radial cylinders of the motor, but for simplicity the cylinders and cylinder heads are omitted from the drawings. It is understood that these parts may conform to the construction shown in my said patent, or with any other type of radial motor. The rod 20 is the master connecting rod in the present construction, and it is preferably formed integral with the two annular disc-like members 21, 22 which are spaced laterally apart and to which all of the remaining connecting rods of the motor are journaled. In the preferred construction, therefore, the master rod 20 has integrally formed with it a cylindrical portion 23 for encircling the wrist pin (which in the construction shown comprises the tubular member 10) and the annular members 21, 22 at each end of the cylindrical portion 23, although I do not intend to exclude from the scope of my invention a structure in which these parts are separately formed, and then assembled. This combined member has a bore 24 of such diameter as to encircle the tubular wrist pin 10 and the bushings surrounding the wrist pin. I have shown the bushing divided into separate halves lengthwise and it may be placed over the tubular wrist pin 10. One of these bushing sections 25 is of annular shape and is adapted to be slid lengthwise over the tubular wrist pin 10 until it rests against the shoulder 11 and this bushing member is provided with a lateral flange 26 against which one edge of the annular member 21 is adapted to engage. The flange 26 has a cutout 27 for a purpose which will appear in the subsequent description. In the construction shown, the bushing member 25 is one-half the length of the total bushing, although this proportion is not compulsory. The other bushing member is shown at 28 and it comprises a cylindrical portion adapted to be slid endwise over the wrist pin 10 and to abut against the annular portion 19 of the crank arm 5. This bushing member is provided with a lateral flange 29 in which is formed a recess or socket 30.

All of the connecting rods other than the master or controlling rod are connected to the annular members 21, 22 in the same manner, so that a description of one of these connections will suffice for all of them. For each of the detachable connecting rods 31 there are aligning apertures 32 in the annular members 21, 22 to receive the knuckle pins 33 on which these connecting rods are journaled. The several knuckle pins 33 are shown as tubular in form and they pass through the apertures 32 in the annular members 21, 22 and through the hub 34 at one end of each connecting rod 31. Each pin 33 is provided with a circular socket or recess 35 at one end. One end of each of the pins 33 is adapted to engage with the flange 26 of the bushing 25 to prevent the pin from moving lengthwise out of position in one direction. For preventing these pins from moving lengthwise in the opposite direction, I have provided an annular ring 36, preferably having a concentric socket 37 so that the portion 38 of this ring will fit into the recess 30 in the bushing member 28; and the portion 39 will encircle the outer edge of the flange 29 of this bushing member, as shown in Figure 2. The annular ring 36 is of such external diameter that it will project into the several recesses 35 in the ends of the knuckle pins 33 so that the shoulders of these recesses will engage against one face of the annular ring 36 and the latter will thereby prevent longitudinal movement of the pins 33 in one direction. This annular ring 36 is provided with a groove or cutout 40 at one point to receive a portion of the head of the bolt 41 which passes through an aperture 42 in the master connecting rod 20. The nut 43 of this bolt is adapted to project into the cutout 27 of the flange 26 of the bushing member 25 for the purpose of preventing any rotation of the latter in relation to the annular member 21. The nut 43 is preferably locked by the pin 44.

In preparing to assemble the parts of the device, the two shaft sections 2, 3 will first be in separated positions; and the first operation may be that of placing the bushing member 25 endwise over the tubular wrist pin 10 until it seats against the shoulder 11. At this time the bolt 14 is removed and the bolt 41 is also removed. The next step will be to insert the bushing member 28 into the bore 24 and then move these parts over the cylindrical wrist pin 10, until the member 21, 23 passes over the bushing member 25 and seats against the flange 26. The shaft section 3 with the crank arm 5 is then moved up toward the shaft section 2, so that the end of the wrist pin 10 receives the hub 18 within its bore, as shown in Figure 2. The bolt 14 is then passed through the bore 13 of the member 4 and it is screwed into the threaded aperture in the boss 18 so that the members 4 and 5 are securely held against longitudinal separation. The locking pin 17 may then be inserted to keep the bolt head 16 from revolving, so that the bolt 14 cannot come loose. Before the bushing 28 is inserted into the bore 24 the ring 36 is slipped over the straight portion of the bushing 28, so that it fits into the socket 30 and overlaps the flange 29. Therefore, when the assembly above described takes place the ring 36 is also assembled. Before the ring 36 is moved to the position shown in Figure 2, it will be necessary to turn the several knuckle pins 33 into such position that their notches 35 will receive the edge of the ring 36. The bolt 41 will now be inserted into the aperture 42 at the base of the master rod 20 and the head of this bolt will be received into the recess 40 of the ring 36. The nut 43 is then applied to the bolt 41 and the locking pin 44 may be applied to prevent the nut 43 from coming loose.

It will be apparent from the above that I have provided a very simple and strong shaft and crank arrangement which may be readily assembled and disassembled, but which will be substantially as strong and rigid as the one piece crank construction. The tubular wrist pin 10 being clamped internally and externally between the boss 18 and the portion 19 will prevent any movement between the crank arms 4, 5 except in the direction of the wrist pin 10, but this movement is prevented by the bolt 14.

When the complete device is in assembled condition, all of the knuckle pins 33 by which each of the connecting rods 31 are fulcrumed to the members 21, 22 are held against longitudinal displacement in one direction by the flange 26 of the bushing member 25, and they are held from displacement in the opposite direction by the ring 36 which engages in the several notches 35. The ring 36 also prevents the several pins 33 from revolving in their several apertures 32. The single ring member 36, therefore, serves to hold all of the knuckle pins 33 in assembled condition, as compared with the many bolts heretofore used for the purpose. There is no chance of the ring 36 becoming loose or displaced during the operation of the engine. As long as the bolt 41 is in place in the bore 42, the ring 36 cannot revolve in relation to the member 22. If it is desired to remove any one of the knuckle pins 33 it is necessary to first remove the bolt 41, after which the ring 36 may be revolved in relation to the bushing 28, until the opening 40 registers with the aperture 32 of whichever knuckle pin 33 is to be removed. When this registering operation is completed, the particular knuckle pin 33 may then be driven out from left to right in Figure 3, moving partly through the opening 40 of the ring 36. A new knuckle pin 33 may then be reinserted into position with its notch 35 in line with the ring 36. The ring 36 may then be turned to bring its opening 40 in register with any other knuckle pin 32 which is to be removed, and this operation may be repeated until all of the pins 33 on all of the connecting rods 31 have been removed and replaced. If only one or two are to be replaced, the operation will only be carried on as to those particular pins. When the knuckle pins 33 have been removed and replaced, the ring 36 will be turned around until its opening 40 is in line with the bolt 41, whereupon the latter is returned to the bore 42 and its nut 43 is applied. From then on, the ring 36 is prevented from turning in relation to the member 22 by the bolt 41, so that all of the knuckle pins 33 are locked by the ring 36. It will be apparent, therefore, that without disassembling the whole knuckle construction, the various crank pins 33 may be removed and replaced. While the motor is in operation, all of these pins are held in assembled condition by the single ring 36. This construction is simpler and more dependable than the devices heretofore employed for the purpose.

Having described my invention, what I claim is:

1. In a crank construction for motors, the combination of a shaft composed of separable sections, each having a crank arm projecting laterally therefrom, one of said crank arms having a tubular wrist pin extending laterally therefrom and having a shoulder adjacent the base of said wrist pin, the other of said crank arms having a boss fitting into the bore of said wrist pin and having an annular member surrounding the end of said wrist pin and forming a shoulder, a bushing fitting over said wrist pin and lying between said shoulders, and a connecting rod having a bearing member surrounding said bushing.

2. In a crank construction for motors, the combination of a shaft, a crank thereon having a wrist pin, a connecting member, journaled on said wrist pin, a plurality of connecting rods having knuckle pins journaled in said connecting member, and a revolvable ring member for locking all of said knuckle pins in position, and having an opening adapted to be registered with any of said knuckle pins to permit longitudinal removal thereof.

3. In a crank construction for motors, the combination of a shaft, a crank thereon having a wrist pin, a connecting member journaled on said wrist pin, a plurality of connecting rods having knuckle pins journaled in said connecting member, a revolvable ring member for locking all of said knuckle pins in position and having an opening adapted to register with any of said knuckle pins to permit longitudinal removal thereof, and means for preventing said ring from revolving in relation to said knuckle pins during the operation of the motor.

4. In a crank construction for motors, the combination of a shaft, a crank thereon having a wrist pin, a connecting member journaled on said wrist pin, a plurality of connecting rods arranged radially around said connecting member, and having knuckle pins journaled in said connecting member, said knuckle pins having recesses in their ends, and a revolvable ring member for locking all of said knuckle pins in position and engaging in said recesses, said ring member having an opening adapted to register with any of said knuckle pins to permit longitudinal removal thereof.

5. In a crank construction for motors, the combination of a shaft, a crank thereon having a wrist pin, a plurality of radially arranged connecting rods, one of which comprises a master connecting rod having a connecting member journaled on said wrist pin, the remainder of said connecting rods having knuckle pins journaled in said connecting member, and a revolvable ring member for locking all of said knuckle pins in position and having an opening adapted to register with any of said knuckle pins to permit longitudinal removal thereof.

6. In a crank construction for motors the combination of a shaft, a crank thereon having a wrist pin, a plurality of radially arranged piston rods, one of which comprises a master connecting rod having a connecting member journaled on said wrist pin, the remainder of said connecting rods having knuckle pins journaled in said connecting member, and a revolvable ring member for locking all of said knuckle pins in position and having an opening adapted to register with any of said knuckle pins to permit longitudinal removal thereof, and a bolt arranged adjacent said master connecting rod extending into said opening of said ring member to prevent the latter from revolving.

7. In a crank construction for motors, the combination of a shaft, a crank thereon having a wrist pin, a plurality of radially arranged connecting rods, one of which comprises a master connecting rod having a connecting member journaled on said wrist pin and having spaced annular flanges provided with apertures, knuckle pins journaled in said latter apertures and to which the remaining connecting rods are connected to lie between said annular flanges, and a revolvable ring for preventing longitudinal displacement of said knuckle pins, said revolvable member having an opening adapted to register with any of said latter pins to permit longitudinal removal thereof.

8. In a crank construction for motors the combination of a shaft, a crank thereon having a wrist pin, a master connecting rod having a connecting member journaled on said wrist pin, a bushing between said connecting member and said wrist pin, having a lateral flange, a plurality of radially arranged connecting rods having knuckle pins journaled in said connecting member, and a revolvable ring held in position by the flange of said bushing and adapted to prevent longitudinal displacement of said knuckle pins and having an opening adapted to be registered with any of said latter pins to prevent longitudinal removal thereof.

9. In a crank construction for motors the combination of a shaft, a crank thereon having a wrist pin, a connecting member journaled on said wrist pin, a plurality of radially arranged connecting rods having knuckle pins journaled in said connecting member, a revolvable ring for locking all of said knuckle pins in position, means for locking said revolvable ring in relation to said knuckle pins, and adapted to be operated to permit the revolving of said ring to permit said knuckle pins to be removed longitudinally.

10. In a crank construction for motors the combination of a shaft, a crank thereon having a wrist pin, a connecting member journaled on said wrist pin, a bushing composed of separable sections, having lateral flanges engaging opposite sides of said connecting member, a plurality of radially disposed connecting rods having knuckle pins journaled in said connecting member, and a revolvable ring member held in place by one of said flanges on the bushing, and adapted to prevent longitudinal displacement of said knuckle pins, said revolvable member having an opening adapted to register with any of said knuckle pins to permit longitudinal removal thereof.

11. In a crank construction for motors the combination of a shaft, a crank thereon having a wrist pin, a connecting member journaled on said wrist pin, a bushing composed of separable sections, having lateral flanges engaging opposite sides of said connecting member, a plurality of radially disposed connecting rods having knuckle pins journaled in said connecting member, and a revolvable ring member held in place by one of said flanges on the bushing, and adapted to prevent longitudinal displacement of said knuckle pins, said revolvable member having an opening adapted to register with any of said knuckle pins to permit longitudinal removal thereof, and means for clamping said ring member in relation to said connecting member to hold the same in locking relation to said knuckle pins.

12. In a crank construction for motors the combination of a shaft composed of separable sections, each having a crank arm projecting laterally therefrom, one of said crank arms having a tubular wrist pin extending laterally therefrom, the other of said crank arms having a boss extending into said tubular wrist pin, and having an annular member surrounding the end of said wrist pin, means for securing said crank arms against longitudinal separation, a master connecting rod having a connecting member journaled on said wrist pin, a bushing composed of separable sections, having lateral flanges lying in opposite sides of said connecting member, a plurality of radially arranged connecting rods, each having a knuckle pin journaled in said connecting member to prevent it from moving longitudinally in one direction by one of the flanges in said bushing, a revolvable ring member held by another flange of said bushing, and adapted to prevent longitudinal movement of said knuckle pins in one direction, said ring member having an opening adapted to register with any of said knuckle pins to permit longitudinal removal thereof.

13. In a crank construction for motors, the combination of a shaft, a crank thereon having arms and a wrist pin, a connecting member having a plurality of apertures journaled on said wrist pin, knuckle pins in said apertures, a plurality of connecting rods journaled on said knuckle pins, a member having a locking groove and a ring held in said locking groove and disposed between the arms of said crank and engaging said knuckle pins to prevent them from moving endwise out of said connecting member.

14. In a crank construction for motors, the combination of a shaft, a crank thereon having arms and a wrist pin, a connecting member having a plurality of apertures journaled on said wrist pin, knuckle pins in said apertures, a plurality of connecting rods journaled on said knuckle pins, a member having a locking groove and a ring locked in said groove and disposed between the arms of said crank and engaging said knuckle pins to prevent them from moving endwise out of said connecting member, and means for preventing said ring from revolving in relation to said connecting member.

15. In a crank construction for motors, the combination of a shaft, a crank thereon having arms and a wrist pin, a connecting member having a plurality of apertures journaled on said wrist pin, knuckle pins in said apertures, a plurality of connecting rods arranged radially around said connecting member journaled on said knuckle pins, said latter pins having recesses, a member having a locking groove and a ring member held in said locking groove and disposed between the arms of said crank and adapted to prevent said knuckle pins from moving lengthwise out of said connecting member and cooperating with the recesses of said knuckle pins to prevent said pins from revolving in relation to said connecting member.

16. In a crank construction for motors, the combination of a shaft, a crank thereon having a wrist pin, a master connecting rod having a connecting member journaled on said wrist pin, said connecting member having a plurality of apertures, knuckle pins in said apertures, a bushing between said connecting member and said wrist pin having a locking groove, a plurality of radially arranged connecting rods journaled on said knuckle pins, and a ring held in position in the locking groove of said bushing and adapted to prevent longitudinal displacement of said knuckle pins.

Signed at the city, county and State of New York, the 14th day of February, 1928.

JOHN NEWMANN.